FIG. 1

INVENTOR.
EDWARD H. DINGER
HIS ATTORNEY

INVENTOR.
EDWARD H. DINGER

United States Patent Office 3,559,017
Patented Jan. 26, 1971

3,559,017
PULSE SYNCHRONIZING MOTOR CONTROL
Edward H. Dinger, Waynesboro, Va., assignor to General
Electric Company, a corporation of New York
Filed July 2, 1968, Ser. No. 742,004
Int. Cl. H02p 5/06
U.S. Cl. 318—314                                 31 Claims

ABSTRACT OF THE DISCLOSURE

There is described a motor control system in which a master source of pulses is compared for repetition rate and phase equality with a pulse train establishing the motor speed. The system is a direct ratio system in that the exact number of master pulses capable of producing the desired motor speed is selected for comparison with the pulse train establishing the motor speed. Because the pulse selection process results in an uneven pulse train, a regularizing circuit is employed to present substantially evenly spaced master pulses to the comparison circuit. The pulse comparison circuit is a digital discriminator producing a time modulated pulse output for substantially equal repetition rate pulse trains and a direct voltage output indicative of which pulse train has the higher repetition rate when the repetition rates of the pulse trains differ.

FIELD OF THE INVENTION

This invention relates to a motor control system and more particularly to a motor control system in which a selected number of pulses is compared to pulses establishing motor speed to regulate the speed of the motor.

HISTORY OF THE ART

Highly accurate control of motor speed is a problem which has generated many answers. Many of the solutions for precise motor speed control are analog systems where a voltage level serves as the reference for the system. The solutions which provide a digital reference have proven to offer a more exact command of motor speed.

Analog methods of speed control most often are not able to accommodate precise tracking of one or more motors at a prescribed fractional speed of a master motor. It is accordingly an object of the present invention to provide a digital motor speed control system capable of absolute fractional speed tracking of a master motor.

Digital motor control systems are not new. A common disadvantage of such systems, however, is that counters are used to count a predetermined number of master pulses and produce an output pulse proportional to the desired period of motor speed. This proves awkward because it is necessary to calculate the reciprocal of the period to determine the frequency of the motor, or to resort to additional circuitry to indicate motor speed. Another object of the invention is, therefore, to provide a speed control system in which a direct selection of master pulses is made to provide a desired speed indicative reference for control of motor speed.

BRIEF DESCRIPTION OF THE INVENTION

In general, absolute fractional speed tracking is achieved by selecting a predetermined fraction of the pulses from a source of pulses to form a master pulse train for each motor controlled. Each master pulse train thus has a repetition rate directly proportional to the desired motor speed. In a multi-motor system, there is included for each motor controlled a digital discriminator which produces a corrective output when the master pulse train repetition rate differs from that of the actual speed indicative pulse train. The actual speed indicative pulse train may be produced by the local oscillator in the speed control circuit for an AC motor or might be the output of a tachometer coupled to the DC motor being controlled. The discriminator is sensitive to pulse train phase difference when the repetition rates of the pulse trains become substantially equal, and continues corrective action during this time. Because the pulse train comparison made by the discriminator is on a pulse by pulse basis and because the master pulse selection process results in unevenly distributed pulses, the system includes a pulse regularizing device for equalizing the time between pulses in each selected pulse train before it is applied to the digital discriminator. The system also includes stabilizing means for adding a transient corrective signal to the discriminator output to jog the speed control circuit for the motor so that motor speed and therefore the speed indicative pulse train arrives at a stable phase relationship with respect to the master selected pulse train.

BRIEF DESCRIPTION OF THE DRAWINGS

The objects and features of the invention set forth above and other features and advantages of the invention will become more apparent from the detailed description of one embodiment of the invention which is described with reference to the drawings, in which.

Figure 1:
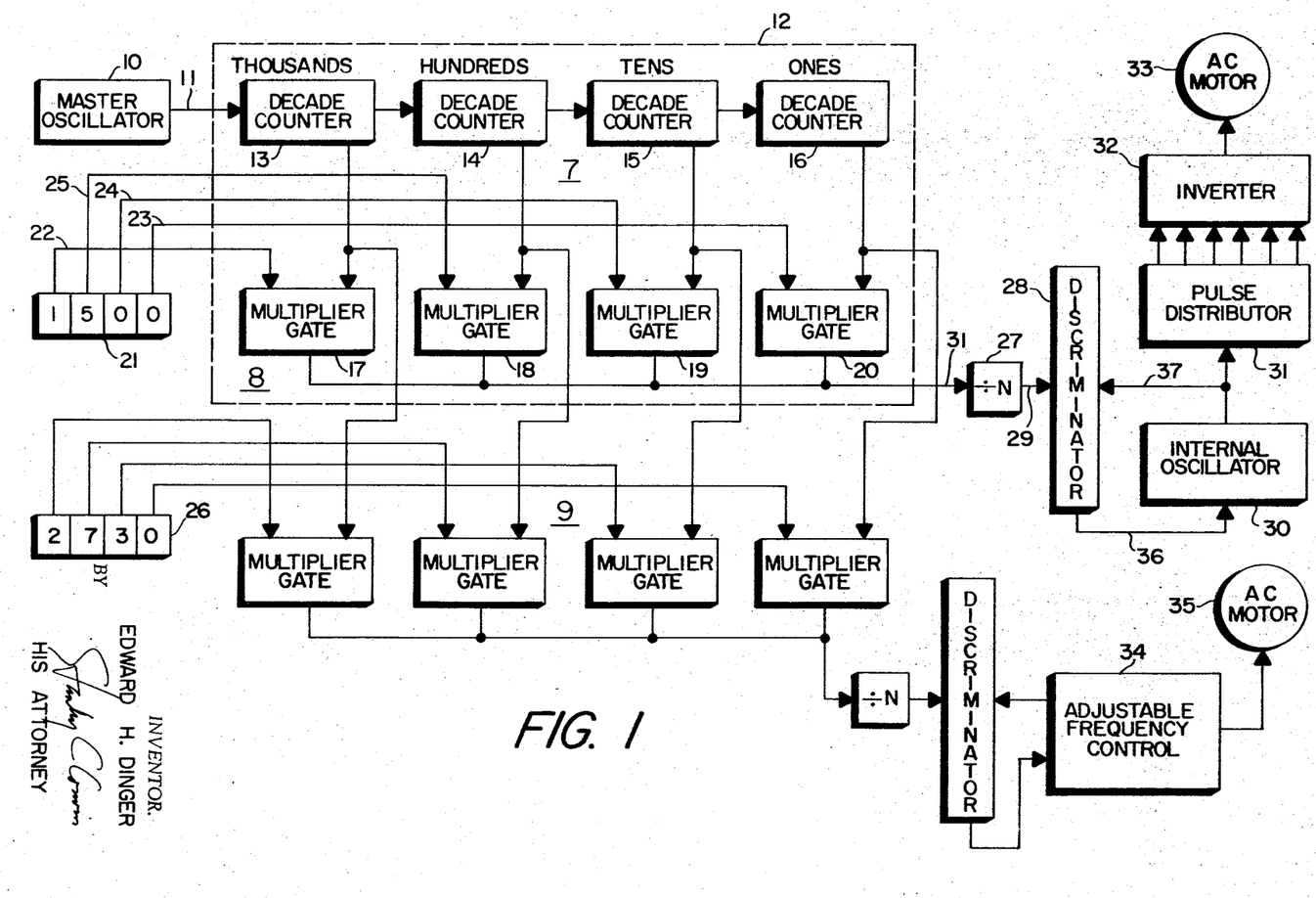
FIG. 1 is a block diagram of a motor control system according to the invention.

Referring now to the drawings wherein like reference numerals refer to like parts throughout, there is shown in FIG. 1 a motor control system for a plurality of motors of which two motors 33 and 35 are shown. Each of the motors has an adjustable frequency control, such as control 34 for motor 35, to control the speed of the motor. The adjustable frequency control for the motor 33 comprises an internal or local oscillator 30 which supplies a pulse train to pulse distributor 31. The pulse distributor could be, for example, a ring counter which routes the pulses to the various SCR's or transistors in the inverter 32. The adjustable frequency control contemplated for use with the motor control system shown in FIG. 1 is set forth in my copending application Ser. No. 674,522, filed Oct. 11, 1967, and now abandoned.

With the inclusion of block 34 in the diagram of FIG. 1, it is perhaps more correct to refer to the system shown in FIG. 1 as an adjustable reference for the adjustable frequency control 34. Without resolving the label which might be placed on the system shown in FIG. 1, it is sufficient to say that this figure is representative of a motor control system, an absolute fractional speed tracking system and an adjustable digital reference for motor speed control.

It should be noted that while AC motors are shown in FIG. 1, the system is not limited to use with AC motors and could readily be used with DC motors. In this case, the adjustable frequency control 34 would be replaced by a phase control circuit utilizing the output of the discriminator 28 as the reference for controlling the DC motor. The feedback pulse train to the discriminator, which is shown in FIG. 1 as being supplied by the local oscillator 30, could be supplied from a tachometer coupled to the DC motor.

FIG. 1 shows that the speed reference voltage for each motor is derived from a discriminator circuit 28. The discriminator for each motor receives a selected fraction of the master pulse 10 from pulse rate multiplier 12 and pulse distribution regularizing circuit 27. The discriminator compares the repetition rate and relative phase of the slave pulse train establishing motor speed with the selected master pulse train to derive an output voltage for use in correcting the frequency of the slave pulse train.

Master oscillator 10 can be a precision oscillator, such as a crystal controlled oscillator, for very accurate electronic gearing of motors 33 and 35 with respect to each other; or, the master oscillator can be another motor having a tachometer or other device for generating a pulse train proportional to a master motor speed so that the motors 33 and 35 are caused to absolutely track the master motor.

For each of the motors controlled in the system shown in FIG. 1, there is selected a fraction of the pulses from the master oscillator. This fraction of master pulses is selected by a selection control device 21 which might be a thumbwheel switch or a preset counter or register, for example. It is noted that selection control 21 is set to the number 1,500. The selection control 26 for motor 35 is set to select 2,730 of the master pulses. The selection control 21 controls the operation of controlled gate 8 which is comprised of four multiplier gates, one for each decade of the counter 7 of the pulse rate multiplier 12. The counter 7 serves to group the master pulses into decades. Thus, for each 10,000 pulses, the four counters 13, 14, 15 and 16 will count to 9,999 and return to zero. The thumbwheel switch 21 is shown having four stages, a thousands stage, a hundreds stage, one for tens and the fourth being for the ones. These stages are connected by leads 22–25 to appropriate multiplier gates 17–20. The controlled gate portion of the pulse rate multiplier can be repeated for each motor which is desired to be controlled from the same master oscillator 10. This is illustrated by thumbwheel switch 26 and the second set of multiplier gates 9 for motor 35.

The operation of the multiplier gates under the control thumbwheel switch is described below with reference to FIG. 2. It is sufficient to note at this point that when the thumbwheel switch is set to permit 1,500 master pulses to be applied to the discrimnator, for every 10,000 pulses produced by the master oscillator, multiplier gate 17 will permit passage of 1,000 pulses; gate 18 will permit 500 pulses to pass; and multiplier gates 19 and 20 will permit no master pulses to pass. Thus it can be seen that the selection control means 21 and 26 provide a direct reading of the ratio of master pulses to selected pulses. It will be shown below that these readings can be controlled to provide a direct indication of motor speed.

The selected pulse train for each motor is applied to a discriminator 28 which compares this pulse train with the speed indicative pulse train for the motor controlled. Because the selection process of the pulse rate multiplier produces an unevenly distributed pulse train and because the digital discriminator 28 compares pulse repetition rates on a pulse by pulse basis, thereby demanding relatively evenly distributed pulse trains, a pulse position regularizing circuit 27 is provided. While the function performed by the regularizing circuit is quite essential to the operation of the system, it is only shown in block diagram form with the symbol "divide by N," because the circuit may simply comprise a preset counter, i.e., a series of flip-flops arranged to divide the pulse train from the selection gates by a factor N. Thus the regularizing circuit is a preset pulse selector permitting every Nth pulse to pass to the discriminator. Because the division by N reduces the output frequency of the master pulse train at line 31, the frequency of the master oscillator used will have to be increased by the same factor N.

It is noted that the factor N in the pulse divider 27 can be selected so that the number registered by the thumbwheel switch 21 is a direct reading of the frequency applied to the motor. For example, if the frequency of the master oscillator is selected to be 240,000 Hz. and N is selected to be 40, then $$\text{output frequency} = 1/6 \times \frac{240{,}000 \times TW \text{ setting}}{40}$$

where TW setting is the number of pulses selected from the master oscillator and is registered by the thumbwheel switch, $1/6$ is the fraction of the internal oscillator frequency applied to the motor by the pulse distributor 31 which distributes firing pulses to the SCR's in the inverter at 60° intervals, 6 pulses from the internal oscillator being required for one cycle of frequency at the motor. It is seen that the equation then reduces to output frequency = $1{,}000 \times TW$ setting. Thus, a thumbwheel setting of .1500 results in an output frequency of 150 Hz. For a two pole motor, the division factor 40 could be changed to 240 such that the thumbwheel setting reads .9000, a direct indication of motor r.p.m. The master oscillator frequency of 240,000 Hz. is assumed to have been increased to this amount from the original oscillator frequency by the factor N so that the selected number of pulses applied to the discriminator is the frequency which is desired to be applied to the motor to have it run at the selected speed.

The discriminator 28 compares the repetition rate of the master or selected pulse train with the slave or pulse train establishing motor speed to provide a correction signal for increasing or decreasing the repetition rate of the slave pulse train so that the slave pulse train will become synchronized with the master pulse train. At the point of synchronization the discriminator responds to phase difference between the two pulse trains to continue correction until the two pulse trains are in a phase stable relationship.

It is seen that the direct setting frequency reference system shown in FIG. 1 can be used for accurate speed control of individual motors from a fixed master oscillator. In addition, the thumbwheel setting provides an indication of the ratio for motor speed tracking where the oscillator is an adjustable source such as another motor. Here each controlled motor remains fixed at a preset electronically geared relationship to the frequency of the other controlled motors. This system, thus, provides an adjustable and absolute frequency control.

Figure 2:
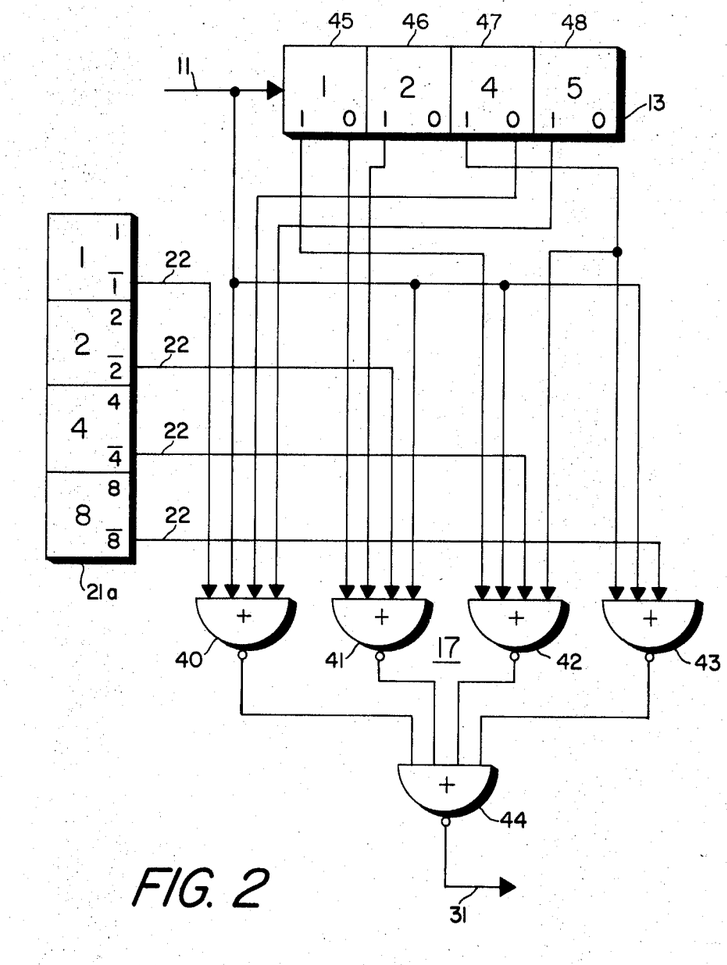
FIG. 2 is a logic diagram of one stage of the pulse rate multiplier shown in FIG. 1.

Referring now to FIG. 2 there is shown a single stage of the decade counter, the thumbwheel switch and the multiplier gate of the pulse selection arrangement shown in FIG. 1. The decade counter 13 is shown in FIG. 2 which is the thousandths counter and is represented by a 1–2–4–5 coded set of four flip-flops 45–48. The outputs of these flip-flops are applied to NOR gates 40, 41, 42 and 43, which gates also receive the controlling signal from portion 21a of the thumbwheel switch. The thumbwheel switch portion 21a is a 1–2–4–8 coded device. It should be obvious at this point that the thumbwheel switch could readily be replaced by four flip-flops to provide the same function. The master pulses are supplied to the decade counter 13 and also to each of the NOR gates 40–43. A combining NOR gate 44 receives the output of each of the other NOR gates to provide the portion of the output pulses on lead 31 supplied by multiplier gate 17.

Figure 3:
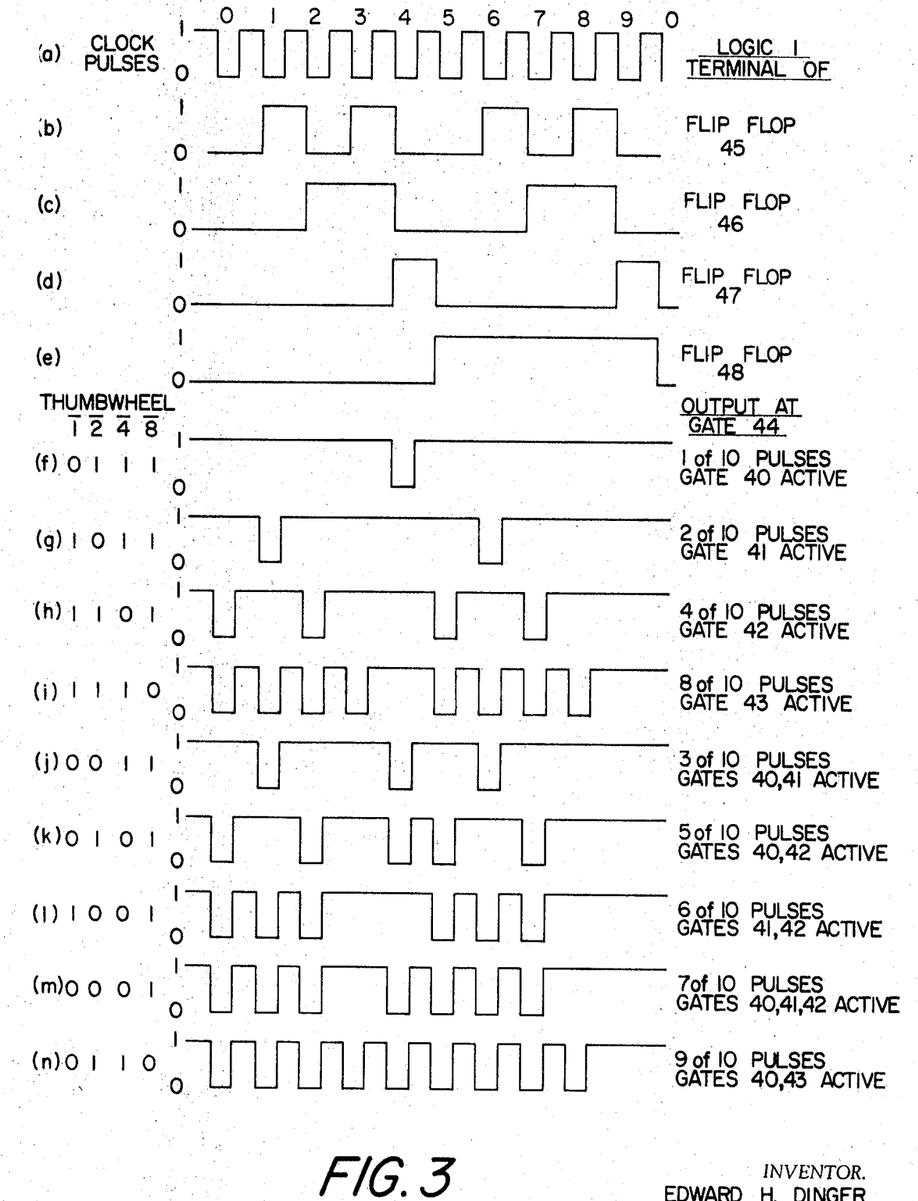
FIG. 3 is a voltage-time plot useful in understanding the operation of a single stage of the pulse rate multiplier shown in FIG. 2.

Considering the voltage-time plot shown in FIG. 3, it is seen that gate 40 produces an output once every ten pulses, gate 41 produces an output two times for every ten pulses, gate 42 permits passage of four of every ten pulses and gate 43 permits passage of eight of every ten pulses. Plots (b)–(e) of FIG. 3 show the output of the flip-flops necessary to produce the desired gate output pulses from the gates 40–43. In plots (f)–(n) of FIG. 3, the thumbwheel setting for the reset or bar state is shown at the left to produce the different outputs. The NOR gates 40–44 are responsive to zero logic such that when it is desired to have one pulse out for each ten pulses in, the number 1000 is set into the thumbwheel which presents the 0111 output at the barred sides. Since the $\overline{1}$ position of the thumbwheel is connected to gate 40 and the $\overline{2}$, $\overline{4}$ and $\overline{8}$ positions are connected to gates 41, 42 and 43 respectively, only gate 40 is enabled by the 0111 setting.

It is noted that gate 40 receives the $\overline{4}$ reset output from flip-flop 47 and also the 5 set output of flip-flop 48. Looking now to plots (d) and (e) of FIG. 3, it can be seen that the $\overline{4}$ terminal of flip-flop 47 is at logic zero at clock pulse 4 and also at clock pulse 9. During these two periods it is noted that the logic 1 terminal of flip-flop 48 is in the logic zero position only during the clock pulse 4 period. Thus, there is only one time, at clock pulse 4, during the receipt of ten clock pulses that there is an enabling input to gate 40. The logic 0 from thumbwheel section 1, the logic 0 from the $\overline{4}$ output of flip-flop 47, the logic 0 output from the 5 output of flip-flop 48 and the logic 0 state of clock pulse 4 combine to provide the unique condition necessary to realize a logic 1 pulse output from gate 40.

It can be seen that this is a unique condition recognized by the discriminator. The NOR gates produce a logic 1 when all inputs are 0 and a logic 0 when any input is a logic 1. Since the discriminator recognizes only logic 0 pulses, the receipt of a logic 1 by gates 41, 42 and 43 from the $\overline{2}$, $\overline{4}$, $\overline{8}$ outputs of the thumbwheel generates a logic 0 at the input to gate 44. These logic 0 inputs to this gate will not affect the logic 1 input from gate 40. Thus gate 44 produces a logic 0 pulse on lead 31 which is an operative master pulse at the discriminator.

The pulse that is derived from gate 40 occurs when the pulse from the master at line 11 which is applied to each of the gates 40–43 goes to zero. It will be seen from further examination of different numbers of pulses selected that the flip-flops 45–48 of the decade counter 13 are wired to gates 40–43 in such a manner that a unique combination of pulses is obtained for each desired setting. Also, the wiring of the flip-flops was selected to provide as even a distribution of output pulses as possible. However, it is noted with reference to plot (e), for example, that the six of ten pulses situation produces a three to one difference in the distribution of the pulses. This plot is reproduced again in FIG. 4 to show how the pulse divider 27 of FIG. 1 operates on the pulses prior to their being applied to the discriminator to optimize the spacing between pulses for proper discriminator operation.

Figure 4:
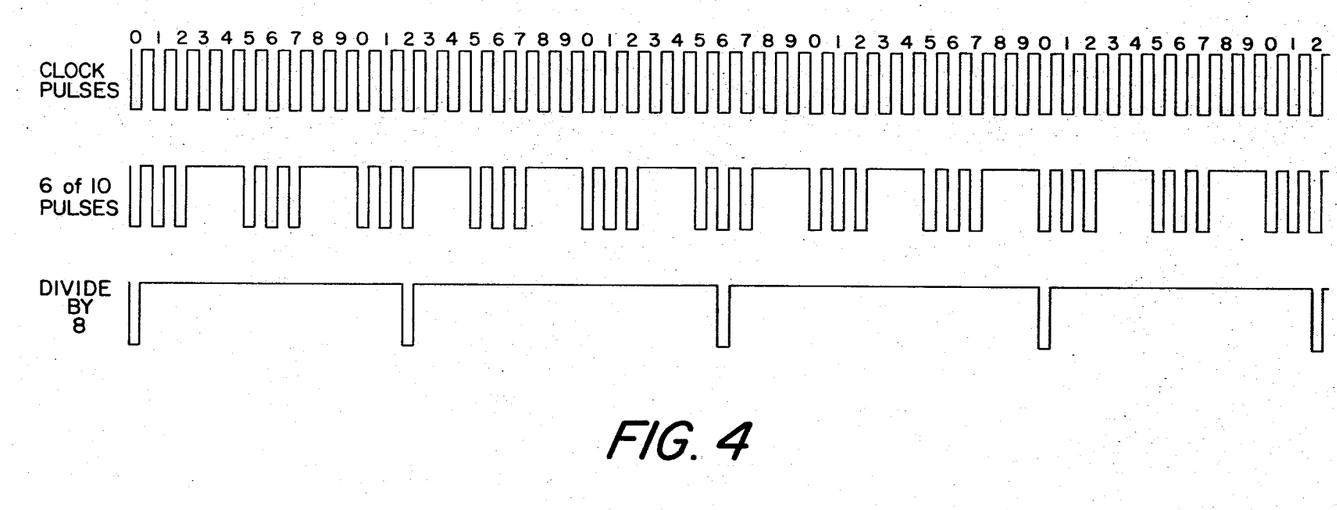
FIG. 4 is a voltage-time plot illustrating the operation of the pulse regularizing circuit shown in FIG. 1.

FIG. 4 shows that by selecting the number 8 as the divisor for circuit 27, the ratio of maximum spacing to minimum spacing has been reduced from three to one to fourteen to twelve which is a 1.17 to 1 ratio, well within the tolerance limits of the discriminator 28.

Figure 5:
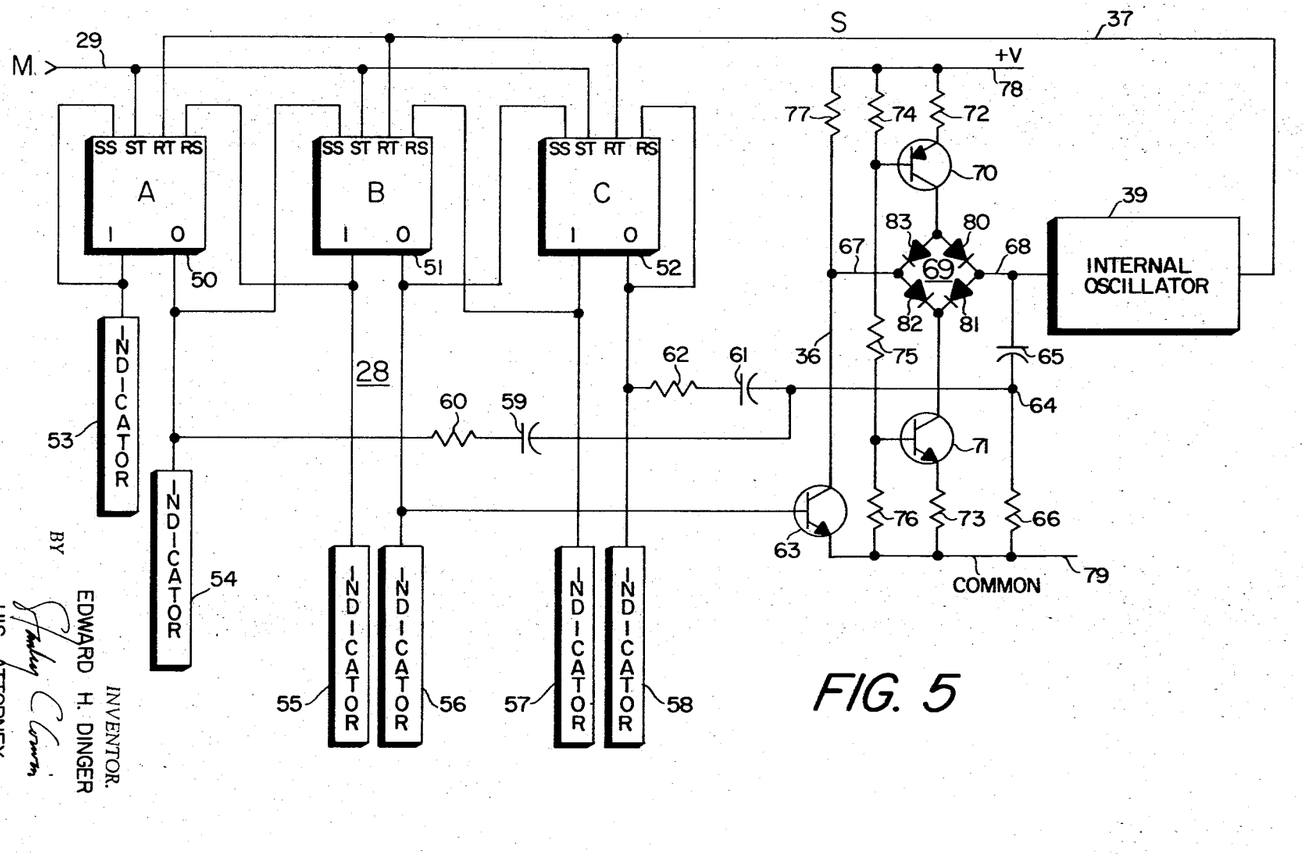
FIG. 5 is a partial block and partial schematic diagram of the digital discriminator shown in FIG. 1.

The discriminator, an integrating accelerate-decelerate circuit and the internal oscillator 39 of the motor speed control are shown in FIG. 5. The discriminator consists of three flip-flops, A, B and C. The three flip-flops are capable of providing "too high," "too low" and "just right" information so far as concerns repetition rate difference in the two pulse trains applied thereto. Thus if the pulse repetition rate of the master pulses applied to the set trigger input of each of the flip-flops on lead 29 exceeds the repetition rate of the feedback or slave pulses applied to the reset trigger input of each of the flip-flops on lead 37, the C flip-flop will provide an indication that the motor speed is too low. Likewise, an indication at the A flip-flop indicates that the motor speed is too high and an indication from the B flip-flop shows that the motor speed is substantially synchronized to the master pulse train.

Indicators 53–58, such as lights, are connected to the outputs of each of the flip-flops. These indicators provide the "too high," "too low," and synchronized indications described. It is to be noted, however, that only the reset output of flip-flop B is directly connected to the motor speed control circuit. This connection is described below. The import of this single connection, as will be appreciated, is that the B flip-flop is only in an oscillatory mode when pulse repetition rate equality is substantially reached. During the time of pulse repetition rate inequality, the B flip-flop is locked in one state or the other depending upon the direction of difference.

The steering of the flip-flops in FIG. 5 is shown in Table 1.

TABLE 1

To arrive at flip-flop state: A $\overline{A}$ B $\overline{B}$ C $\overline{C}$
Need previous condition: $\overline{A}$ $\overline{B}$ A $\overline{C}$ B C (Where A is the set condition of flip-flop 50 and $\overline{A}$ is the next condition of this flip-flop, etc.)

Referring to Table 1 and observing that master pulses cause true transitions, i.e., a transition to the 1–0 set condition, and that slave pulses cause false transitions, it is noted that in order to steer flip-flop A into the A state, this flip-flop must be steered from a $\overline{A}$ condition. This can be seen by observing the steering connection for flip-flop A which is derived from the set side of the A flip-flop. Thus when flip-flop A is in the $\overline{A}$ state such that a logic 0 appears at the left side, the first logic 0 master pulse which comes along at the set trigger input will trigger the flip-flop back to the A state. Table 1 also shows that in order to set the B flip-flop, it is necessary for the A flip-flop to be in the set condition. The table also shows that to reset B flip-flop to the $\overline{B}$ condition, that flip-flop C must be in a $\overline{C}$ or reset state.

TABLE 2

| | |
|---|---|
| Original condition | $\overline{A}$ $\overline{B}$ $\overline{C}$ |
| $M_1$ | A $\overline{B}$ $\overline{C}$ |
| $M_2$ | A B $\overline{C}$ |
| $M_3$ | A B C |
| $M_4$ | A B C |

Refer now to Table 2 which assumes an initial condition of each of the flip-flops being in the reset state and shows the transition of the flip-flops to the set condition upon the receipt of successive master pulses. Table 2 shows that upon receipt of three successive master pulses, the digital discriminator completely changes state. If follows from Table 2 that if instead of master pulses only being applied to the discriminator, slave pulses are applied, the receipt of three successive slave pulses without any intervening master pulses will bring all three flip-flops back to the reset state.

Assuming again the original reset condition, if both master pulses and slave pulses are applied to the discriminator and the master pulses have a higher repetition rate than the slave pulses, it is seen that eventually flip-flops A and B stay in a set condition while flip-flop C alternates from the set to the reset states.

Referring to FIG. 5, it is seen that in the last-mentioned situation where master pulses of a higher repetition rate than the feedback pulses are applied to the discriminator, the indicator lights for the C flip-flop would continue to flicker showing the higher repetition rate of master pulses. FIG. 5 also shows that the reset output of the B flip-flop 51 is connected through the integrating acceleration-deceleration circuit 69 to the internal oscillator 39 of the motor control. Except for the stabilizing circuits, connected at point 64 to the acceleration-deceleration circuit, the $\overline{B}$ output is the only output applied to the motor control from the discriminator.

In the situation just described where master pulses exceed the rate of feedback pulses, Table 2 shows that B flip-flop 51 is in the set state. In this condition a logic 0 output is realized at the reset terminal. It is noted that a logic 1 is a positive voltage and a logic 0 is a substantially zero voltage. The zero voltage at the base of transistor 63 prevents conduction of this transistor so that a positive blocking voltage appears at point 67 to permit a charging current to be applied to capacitor 65. The voltage stored by capacitor 65 determines the rate of oscillation of the internal oscillator 39. Thus, the increased voltage on this capacitor raises the frequency of the feedback pulse train at a rate determined by the constant current charge rate controlled by transistor 70 and resistor 72. The complete details of the acceleration-deceleration circuit 69 are set forth in the aforementioned copending application Ser. No. 674,552.

Figure 6:
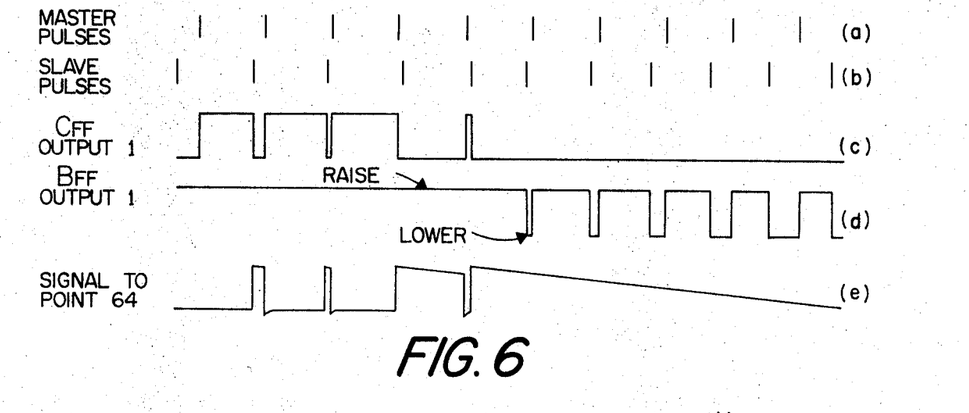
FIG. 6 is a voltage-time plot useful in understanding the digital discriminator of FIG. 5.

Referring now to FIG. 6 in conjunction with FIG. 5, there is shown at (a) the master pulse train and at (b) the slave pulse train as received by the discriminator 28. The situation shown is an increase in the repetition rate of the slave pulses such that they are almost equal to the master pulse repetition rate.

FIG. 6(c) shows that the C flip-flop of the discriminator is in the set condition at the receipt of a master pulse and in the reset condition at the receipt of a slave pulse. FIG. 6(d) shows the B flip-flop output also from the set terminal as being completely in the set condition until the point at which two slave pulses are received within the period between two successive master pulses. At this point, it is seen that the C flip-flop becomes permanently reset while the B flip-flop begins to move from the set condition to the reset condition and back again, with the receipt of slave and master pulses.

It can be seen from FIG. 6 that when the master and slave pulses have equal repetition rates such as is the situation shown at the fourth and fifth slave pulses, the discriminator does not recognize this condition since the center B flip-flop which provides the output to the system continues to remain in the set, i.e., raise-slave-frequency condition. It is only when two slave pulses are received in succession by the discriminator, i.e., at the receipt of the fifth and sixth slave pulses, that the B flip-flop is reset momentarily to the lower command state. Thus, because the repetition rate of the slave pulses must transcend from less than the repetition rate of the master pulses to greater than the repetition rate of the master pulses before the discriminator responds, and as can be seen from FIG. 6(d) that the lower commands are initially much shorter in duration than the raise commands due to the phase relationship between the input pulses, there is a tendency for the discriminator to continue to command raise even though the motor is running higher than the desired speed. Since an increase in slave frequency produces a phase advance, the discriminator will present the desired equal-raise-lower command momentarily at the wrong frequency and continue on to a predominantly lower command. Accordingly, as shown in FIG. 5, a stabilizing circuit has been added to the distributor to quickly bring the slave pulse train into proper phase relationship once the point of near synchronization has been reached. Capacitor 59 and resistor 60 are shown connected in series between the reset output of flip-flop A and point 64 between the speed control capacitor 65 and resistor 66. Also a capacitor 61 and a resistor 62 are connected in a series between the reset side of the C flip-flop and the same point 64.

It can be seen from FIG. 6 that what is desired is to quickly advance the repetition rate of the slave pulses which brings about an immediate phase advance. The transient pulse produced by flip-flop C being reset is shown in FIG. 6(e). Since the reset of flip-flop C is the condition necessary to reset flip-flop B (see Table 2), this pulse appears at the transition from flip-flop C to flip-flop B. When the slave pulse train has a higher repetition rate than the master pulse train and approaches synchronization, a negative pulse is applied to resistor 66 via resistor 60 and capacitor 59. This is due to the setting of flip-flop A being the condition precedent to the setting of flip-flop B the first time two successive master pulses are received. Since resistor 66 is in series with capacitor 65, the stabilizing voltage pulse is placed in series with the steady state speed reference voltage on capacitor 65 to quickly and transiently change the pulse repetition rate of the slave pulses. This quickly changes the B flip-flop output to that shown at the right-hand side of FIG. 6(d) where equal raise and lower signals are shown.

The integrating function provided by the acceleration-deceleration circuit 69 provides isolation of the capacitor 65 from the voltage levels at the output of the discriminator. Thus, when the B flip-flop is in the set condition commanding raise, capacitor 65 is charged from an independent source, the constant current sources 70 and 72. When the B flip-flop is in the reset state commanding lower, the capacitor 65 is discharged via another constant current source, transistor 71 and resistor 73. Thus it can be seen with use of the accelerate-decelerate circuit 69 the voltage level on the capacitor 65 does not affect the current which is supplied or removed from the capacitor. It is the relative charge and discharge rates via the constant current sources which determine what is the stable phase relationship between the master and slave pulse trains and not the voltage level on the capacitor itself. Thus, where the charge rate via transistor 70 and resistor 72 equals the discharge rate via transistor 71 and resistor 73, the stable phase relationship between the master and slave pulse trains is achieved when the slave pulses occur midway between the master pulses.

Figure 7:
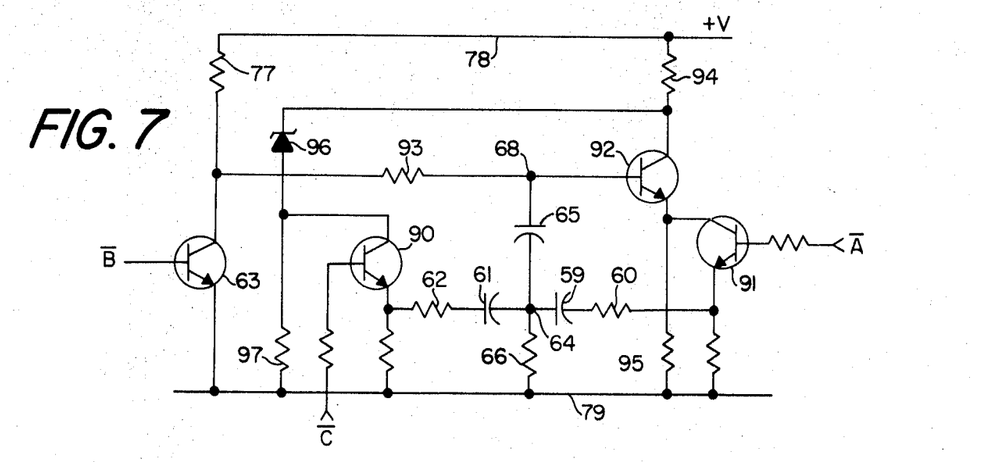
FIG. 7 is a schematic diagram of an alternative embodiment of a stabilizing circuit.
Figure 8:
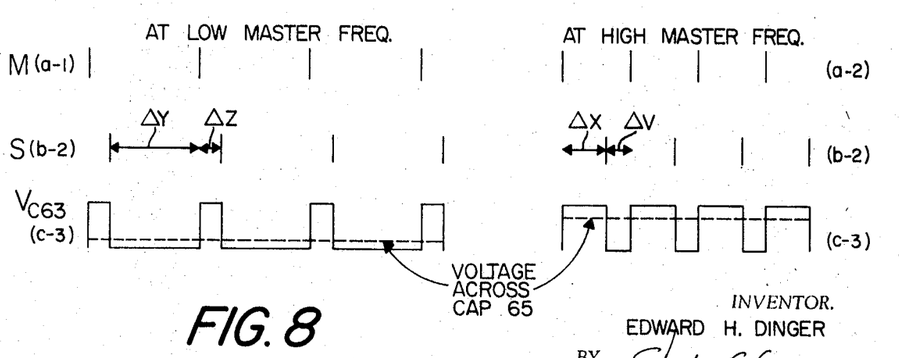
FIG. 8 is a voltage-time plot useful in understanding the stabilizing circuit shown in FIG. 7.

It is not necessary to employ an integrator at the output of the discriminator to achieve the results desired from the system. The output of the center flip-flop can be directly connected to capacitor 65 via transistor 63. Such a relationship is shown in FIG. 7. Here the entire accelerate-decelerate circuit is replaced by a single resistor 93 directly connected between the collector of transistor 63 and the upper plate 68 of capacitor 65. In this situation where there is no isolation between the voltage on the capacitor and the output of the discriminator, it is seen that where higher speeds are called for, the higher voltage on the capacitor requires charging for a longer period of time out of each cycle since the capacitor voltage is closer in value to the positive voltage output from the center flip-flop B of the discriminator. Likewise, at low speeds, the slave pulses appear shortly after the master pulses such that there is a short pulse of positive voltage followed by a longer pulse of substantially zero voltage at the output of the discriminator for each master and slave pulse received. These relationships are shown in the voltage-time plots of FIG. 8. FIG. 8 shows that when the motor is desired to be run at 20% of rated speed, the slave pulse must be at the 20% position of the period between master pulses. This is shown in FIG. 8(c–1). In FIG. 8(c–2) the motor is running at ⅔ speed and the substantially opposite phase relationship is shown.

The simplified voltage output averaging circuit shown in FIG. 7 avoids the relatively complex acceleration-deceleration circuit shown in FIG. 5 but requires a more complicated stabilizing circuit. Due to the effect of the capacitor voltage on the stable phase condition which the discriminator must recognize, there is shown in FIG. 7 an adjustable phase position stabilizing circuit such as is required. The stabilizing circuit provides a voltage supply which is directly proportional to the capacitor 65 for transitions from the A flip-flop to the B flip-flop of the distributor and provides an inversely proportional voltage for transitions from the C flip-flop to the B flip-flop. Transistor 92 with resistors 94 and 95 provide the capacitor dependent supply voltage. Transistor 92 is an emitter follower with its base connected to the capacitor 65 and its emitter and collector resistors 94 and 95 being of equal value. The directly proportional voltage at the emitter of transistor 92 provides the supply voltage for emitter follower transistor 91 which is connected to the $\bar{A}$ output of the A flip-flop and has capacitor 59 and resistor 60 connected from its emitter to resistor 66 much the same as shown in FIG. 5. The voltage which is the supply for transistor 90, which is connected to the $\overline{C}$ side of flip-flop C at its base, changes inversely with capacitor voltage change. This is because as capacitor voltage goes up, the voltage at the emitter of transistor 92 goes up and the voltage at the collector goes down. Since there is equal division of the capacitor voltage by transistor 92 when the capacitor voltage is maximum, the supply voltage +V is divided equally by the equal resistors 94 and 95 such that $V/2$ appears at the collector. A Zener diode 96, equal at its breakdown point to ½ of the supply voltage, reduces the $V/2$ voltage level at the collector of transistor 92 to substantially zero voltage at the collector of transistor 90. Thus, it can be seen the circuit provides a large signal from the $\overline{A}$ point when the feedback frequency approaches a high master frequency from the overfrequency side. This large change is noted by the change $\Delta X$ in FIG. 8(b–2).

It should be noted that resistor 66, both in the averaging circuit shown in FIG. 7 and the integrating circuit shown in FIG. 5 has a two-fold stabilizing effect. Being in series with the capacitor, the transient signal supplied by the RC networks appears across this resistor and is permitted to die out without affecting the steady state voltage on the capacitor. Resistor 66 also immediately realizes any change in voltage that is applied to capacitor 65. Thus, there is an initial quick change in the direction desired reducing the tendency for slow buildup on the capacitor into an overshoot condition.

The invention that has been described has been primarily with reference to a motor control situation. It should be recognized that the digital discriminator is not limited for the comparison of pulses in which motor speed is the end desired. For example, even when the system is used for the control of motors, this system is completely adaptable for use in controlling the positioning of the motors. It must be recognized that the digital discriminator operates in two modes. In its first mode of operation it recognizes the difference in repetition rates between two pulse trains. It produces a first voltage level output when the master pulse train is higher than the repetition rate of the slave pulse train and a second voltage level output when the repetition rates differ in the opposite direction. In the second mode of operation the digital discriminator recognizes phase difference between the pulses of the two pulse trains and produces a signal which directly operates to change the repetition rate of the slave pulse train to accomplish the desired phase shift. This change in frequency is done on a transient basis so that synchronism between the pulse trains remains. Since an output of the discriminator is realized only from the center flip-flop except during the stabilizing condition, it is seen that the A and C flip-flops serve to lock the center flip-flop in a state which merely indicates the direction of the difference in repetition rates. When this difference has been reduced to substantially zero, the center flip-flop is enabled and then recognizes phase difference between the pulses of the two pulse trains.

In addition, it is noted that the 3 flip-flop discriminator shown has a limited range of one master pulse period shift before the discriminator is locked in its output voltage level. By the addition of fourth and fifth flip-flops and steering to permit the center three flip-flops to respond to each pulse received and not be locked until the fourth or fifth flip-flop changes state, the range of the discriminator can be extended.

It is intended that the foregoing description be taken merely as a means of illustrating the invention and not in a limiting manner. Since many variations and alternative embodiments will occur to those skilled in the art, it is intended that the invention should be limited only by the scope of the appended claims.

What is claimed and desired to be secured by Letters Patent of the United States:

1. A motor control system comprising
a master source of pulses;
means for selecting a predetermined fraction of the pulses from said master source to form a first pulse train for each motor controlled;
means for generating a second pulse train for establishing the speed of the motor;
comparison means for comparing the repetition rate of the second pulse train with the repetition rate of the first pulse train and indicating any difference; and
means responsive to the indicated difference in pulse train repetition rates to modify the repetition rate of said second pulse train to equalize the repetition rates of the pulse trains.

2. A motor control system as recited in claim 1 wherein the repetition rate of the first pulse train is directly proportional to the desired speed of the controlled motor.

3. A motor control system as recited in claim 2 further including means for regularizing the pulse distribution of the first pulse train, the regularized pulse train being applied to said comparison means.

4. A control for a plurality of motors comprising a source of master recurrent pulses, means for selecting a fraction of said master pulses to form a respective pulse train for each of said motors, said pulse trains being subject to a degree of irregularity in their instantaneous pulse repetition rates, the number of master pulses selected for each motor being directly proportional to the desired motor speed, means responsive to the distribution of pulses in each respective pulse train for producing a respective second pulse train having a lesser degree of irregularity in the instantaneous pulse repetition rate, and means for synchronizing the speed of each motor to the repetition rate of a respective one of said second pulse trains.

5. A motor speed tracking system comprising
an adjustable repetition rate pulse source;
means for selecting a fraction of the pulses from said source to form a pulse train;
means for regularizing the distribution of the pulses in the pulse train;
and means for synchronizing the speed of the motor to the repetition rate of the regularized pulse train such that the motor tracks at the selected fraction changes in the pulse repetition rate of the adjustable source.

6. A motor speed tracking system as recited in claim 5 wherein said adjustable repetition rate pulse source is a motor with means for producing a pulse train having a repetition rate proportional to motor speed.

7. A speed tracking system comprising
a source of pulses;
a number of motors;
means for selecting a fraction of the pulses to form a pulse train for each motor;
means for regularizing the distribution of the pulses in each selected pulse train;
means for generating a pulse train for each motor, the repetition rate of which establishes the speed of a respective motor;
detecting means for each motor responsive to the regularized selected pulse train and the speed establishing pulse train for the motor to detect difference in pulse repetition rates;
and speed control means responsive to any detected difference in pulse repetition rate for adjusting the speed of each motor to track at the selected fraction changes in the repetition rate of the pulses from said source.

8. A speed tracking system as recited in claim 7 wherein the fraction selected for each motor of the pulses from said source of pulses is a direct indication of the desired motor speed.

9. A speed tracking system as recited in claim 8 wherein said means for regularizing is a pulse divider selecting every Nth pulse from said selected pulse train to present substantially equally distributed pulses to the detecting means, the repetition rate of said source of pulses being increased by the factor N so that the selected fraction continues to directly represent desired motor speed.

10. A speed tracking system as recited in claim 7 wherein said detecting means indicates the direction of the difference in pulse repetition rate and the phase difference between the selected pulse train and the speed establishing pulse train applied thereto.

11. A speed tracking system as recited in claim 10 wherein said detecting means is in a first mode of operation when there exists a difference between the pulse repetition rates of the selected pulse train and the speed establishing pulse train, the output of said detecting means being locked at a first speed corrective voltage level when the pulse repetition rate of the selected pulse train exceeds the pulse repetition rate of the speed establishing pulse train and locked at a second speed corrective voltage level when the pulse repetition rate of the speed establishing pulse train exceeds the pulse repetition rate of the selected pulse train.

12. A speed tracking system as recited in claim 11 wherein the output voltage of said detecting means is applied to the motor speed control means, the first speed corrective voltage level causing the motor speed control means to raise the speed of the motor thereby increasing the repetition rate of the speed establishing pulse train, the second speed corrective voltage level permitting the motor speed control means to reduce motor speed and the repetition rate of the speed establishing pulse train.

13. A speed tracking system as recited in claim 12 wherein said detecting means is in a second mode of operation when the selected pulse train and the speed indicative pulse train are substantially synchronized, the output of said detecting means comprising time modulated pulses, the voltage level of each pulse indicating the direction of the phase difference in the pulse trains and the duration of each pulse indicating the amount of the difference.

14. A speed tracking system as recited in claim 13 wherein said detecting means during said second mode of operation produces a first voltage level when the pulses of the selected pulse train phase lead the pulses of the speed establishing pulse train and a second voltage level when the pulses of the selected pulse train phase lag the pulses of the speed establishing pulse train.

15. A speed tracking system as recited in claim 14 wherein said detecting means is a digital discriminator comprising first and second bistable devices, the first bistable devices producing said time modulated pulses whenever the difference between the pulse repetition rates of the selected pulse train and the speed indicative pulse train is substantially zero, and the second bistable devices causing the first bistable devices to lock at the first and second voltage output levels when a difference exists between the pulse repetition rate of the selected pulse train and the speed establishing pulse train.

16. A speed tracking system as recited in claim 15 wherein said means for selecting includes selection control means and a controlled gate, said selection control means determining the fraction of pulses selected from said source of pulses for each motor and controlling said controlled gate to permit passage of a selected number of pulses for each predetermined number of pulses presented to the controlled gate.

17. A speed tracking system as recited in claim 16 wherein said selection control provides an indication of the ratio of the number of gate output pulses applied to said means for regularizing to the number of input pulses received by said controlled gate.

18. A speed tracking system as recited in claim 17 wherein said means for regularizing is a pulse divider selecting every Nth pulse from said selected pulse train to present substantially equally distributed pulses to the digital discriminator, the repetition rate of said source of pulses being increased by the factor N to preserve the ratio of pulse repetition rate of said source to the speed of each motor.

19. A speed tracking system as recited in claim 18 wherein the division factor N for said pulse divider and the multiplication factor N for said adjustable source of pulses is selected so that the indication provided by said selection control means is a direct reading of motor speed.

20. A speed tracking system as recited in claim 19 wherein said source of pulses is derived from a master motor having means for generating pulses the repetition rate of which is proportional to the speed of the master motor.

21. A speed tracking system as recited in claim 20 wherein each controlled motor is an AC motor and said means for generating a pulse train for each motor is the local oscillator in the speed control means for the motor.

22. A motor control system comprising a master source of pulses;
means for selecting a predetermined fraction of the pulses from said master source to form a first pulse train for each motor control;
means for generating a second pulse train for establishing the speed of each motor;
comparison means for comparing the repetition rate of the first pulse train with the repetition rate of the pulses in the second pulse train and indicating any difference;
means responsive to an indicated difference in pulse train repetition rates to equalize the repetition rates of the pulse trains and control the speed of the motor, said comparison means comprising a pulse repetition rate difference detector, said detector comprising
first and second bistable devices responsive to said first and second pulse trains;
the first bistable devices producing a time modulated pulse output when the difference between repetition rates of the two pulse trains differs by less than a predetermined amount;
the second bistable devices causing the first bistable devices to lock into one of the two voltage levels forming the time modulated pulse output whenever the repetition rate of the first pulse train exceeds the repetition rate of the second pulse train by more than a predetermined amount and causing the first bistable devices to lock into the other of the two voltage levels when the repetition rate of the second pulse train exceeds the repetition rate of the first pulse train by a predetermined amount.

23. A motor control system comprising
a master pulse source providing pulses having a repetition rate proportional to the desired motor speed;
a slave pulse source producing pulses having a repetition rate indicative of the actual speed of the motor;
first and second bistable devices responsive to the master pulses and the slave pulses;
the first bistable devices producing a time modulated pulse output when the difference between the repetition rates of the master and slave pulses differs by less than a predetermined amount;
the output of the first bistable devices being at a first voltage level when master pulses phase lead the slave pulses and in a second voltage level when the slave pulses phase lead the master pulses, the duration of the pulse output in either voltage level being proportional to the amount of the phase difference;
the second bistable devices causing the first bistable devices to lock into the first voltage level when the repetition rate of the master pulses exceeds the repetition rate of the slave pulses by at least said predetermined amount and to lock into the second voltage level when the repetition rate of the slave pulses exceeds the repetition rate of the master pulse by at least said predetermined amount;

and control means for raising the repetition rate of the slave pulses in response to a first voltage level output from said first bistable devices and for lowering the repetition rate in response to a second voltage level output.

24. A control system as recited in claim 23 further including stabilizing means for recognizing substantially equal pulse repetition rates to adjust the relative phase of the master and slave pulses to obtain a balanced condition.

25. A control system as recited in claim 24 wherein said stabilizing means causes a shift in the position of the slave pulses by transiently raising the frequency of the slave pulses when the slave pulses phase lag the master pulses and transiently lowering the frequency of the slave pulses when they lead the master pulses.

26. A control system as recited in claim 25 wherein said stabilizing means shifts the position of the slave pulses to occur midway between master pulses.

27. A control system as recited in claim 25 wherein said stabilizing means shifts the slave pulses to a position relative to the master pulses proportional to the pulse repetition rate of the slave and master pulses.

28. A motor control system comprising
a source of master pulses providing pulses having a repetition rate proportional to the commanded motor speed;
a source of slave pulses providing pulses having a repetition rate indicative of the actual speed of the motor;
discriminator means responsive to master and slave pulse occurrence to produce a first level voltage output pulse at the receipt of a master pulse and a second level voltage output pulse at the receipt of a slave pulse when master and slave pulse repetition rates are substantially equal, and producing said first level voltage output when the repetition rate of the master pulses exceeds the repetition rate of the slave pulses and said second level voltage output when the repetition rate of the slave pulses exceeds the repetition rate of the master pulses;
and control means responsive to first level voltage pulses to increase the repetition rate of the slave pulses thereby shortening the duration of first level voltage pulses, and responsive to second level voltages pulses to decrease the repetition rate of the slave pulses thereby lengthening the duration of first level voltage pulses.

29. An arrangement for energizing a load with voltage of a commanded frequency and amplitude comprising,
a source of a first control signal,
an inverter for converting direct voltage to alternating voltage,
controlled means for applying direct voltage to said inverter when coupled to an external source of power,
means responsive to said control signal for providing gating pulses to said inverter at a repetition rate proportional to a characteristic of said control signal,
means responsive to said control signal for adjusting the amplitude of the direct voltage applied from said controlled means to said inverter to be proportional to said characteristic of said control signal,
said inverter responsive to said provided gating pulses to invert said adjusted amplitude direct voltage applied to said inverter for providing said voltage of commanded frequency and amplitude,
said source of a control signal comprising a master oscillator for producing first pulses of a first recurrence rate,
a pulse rate multiplier,
a source of a multiplying factor signal,
said pulse rate multiplier responsive to said first pulses for producing second pulses having a recurrence rate related to said first pulses by the multiplier factor of said multiplying factor signal,
said source of first frequency control comprising a frequency discriminator responsive to difference in pulse recurrence rate of said second and said gating signals for said inverter for providing said control signal having said characteristic which varies as a function of said difference in pulse recurrence rate.

30. An arrangement according to claim 29 further comprising means for dividing the recurrence rate of said signals available from said pulse rate multiplier to cause said control signals to follow divided recurrence rate of signals available from said pulse rate multiplier.

31. A motor control system comprising a source of pulses having a repetition rate proportional to commanded motor speed;
a source of second pulses having a repetition rate for establishing the actual motor speed;
means for changing the repetition rate of said second pulse train as a function of the difference in the pulse rates of said first and second pulse trains;
and means for controlling the motor speed as a function of the repetition rate of said second pulse train.

References Cited
UNITED STATES PATENTS

| | | | |
|---|---|---|---|
| 3,110,853 | 11/1963 | Jones | 318—314X |
| 3,176,208 | 3/1965 | Gifft | 318—314 |
| 3,295,039 | 12/1966 | MacDonald et al. | 318—314 |
| 3,331,006 | 7/1967 | Strand et al. | 318—314 |

ORIS L. RADER, Primary Examiner

H. HUBERFELD, Assistant Examiner

U.S. Cl. X.R.

318—318, 329, 341